United States Patent Office 3,806,332
Patented Apr. 23, 1974

3,806,332
PLANT AIR POLLUTION PROTECTANTS
Frederick M. Hager, Elmira, Waterloo, Ontario, Canada, assignor to Uniroyal Ltd., Montreal, Quebec, Canada
No Drawing. Continuation-in-part of abandoned Ser. No. 17,942, Mar. 9, 1970. This application May 22, 1972, Ser. No. 255,558
Int. Cl. A01n 9/14
U.S. Cl. 71—90         35 Claims

ABSTRACT OF THE DISCLOSURE

Certain 5,6 - dihydro - 2 - methyl - 1,4-oxathiin-3-carboxamides are effective plant air pollution protectants. For example, 5,6 - dihydro - 2 - methyl - 1,4 - oxathiin-3-carboxanilide or its sulfone control weather fleck on tobacco leaves. Air pollution injury to other crops, particularly from ozone, is controlled by application of the foregoing or related chemicals.

---

This application is a continuation-in-part of my application Ser. No. 17,942, filed Mar. 9, 1972, now abandoned.

This invention relates to a method of protecting plants from air pollution injury.

Air pollution is believed to be responsible for various kinds of injury to plants (Heggestad and Heck, "Nature, Extent and Variation of Plant Response to Air Pollutants," Advances in Agronomy 23: 111–145, 1971). Thus, a disorder of tobacco leaves known as weather fleck is believed to be caused chiefly by the presence of ozone. Although a natural constituent of the atmosphere, ozone in abnormally high quantities is a pollutant. In fact, ozone is a primary air pollutant and is most damaging to plants. The normal ozone level is 3 p.p.h.m. (parts per hundred million). Pollution levels in industrial areas go up to 100 p.p.h.m. Many plants show acute visible injury when exposed for two or more hours to an ozone level of 10 to 40 p.p.h.m. or more. Other air pollutants are sulfur dioxide, fluorides, peroxyacyl nitrates ("PANs"), ethylene, nitrogen dioxide, pesticides, chlorine, heavy metals, acid aerosols, ammonia, aldehydes, hydrochloric acid, hydrogen sulfide and particulates such as cement dust. Sometimes air pollutants are held over a region in a stagnating air mass ("smog") associated with a temperature inversion condition of the atmosphere, which often occurs in midsummer.

Plants affected by such air pollutants include both monoctotyledonous and dicotyledonous species, whether ornamentals or commercial corps. The effect of air pollutants on plants may be visible as necrotic lesions affecting the marketability of the product, for example tobacco, lettuce and spinach. Necrotic spotting of the leaves may be accompanied by early senescence with reduced yields.

Plants showing visible injury to ozone include such genera as Avena, Lycopersicum, Nicotiana, Phaseolus, Pinus, Poa, Polygonum, Solanum, Tetragonia, Allium, Glycine, Vitas, Medicago, Lactuca, etc. (e.g., such crops as oats, tomato, tobacco, beans, pine trees, bluegrass, buckwheat, potato, eggplant, spinach, onions, peppers, soybeans, grapes, alfalfa, lettuce, bedding plants, etc.).

Injury can also occur, but not be observed visually. Thus, decline in yield of citrus has been traced to air pollution injury which is not visible. The extent of such injury has been determined by placing plastic cages over lemon trees, treating the air which is admitted to remove pollutants, and comparing the yield to that of exposed trees. This procedure has shown that air pollutants caused a greatly reduced yield.

The yearly cost of air pollution damage to plants in injury and reduced yields is accordingly substantial. The invention is directed to the reduction of such losses by application of certain air pollution protectants to the plants.

Protection of plants from ozone injury or damage has particular economic significance since annual losses from this cause alone are considerable. The following publications discuss weather fleck in tobacco (believed to be chiefly ozone- induced) and the effect of various chemicals thereon:

Chemical control of Weather Fleck in Flue-Cured Tobacco, E. K. Walker, Plant Disease Reporter, vol. 45, No. 8 (Aug. 15, 1961) pages 583–586.

Evaluation of Foliar Sprays for Control of Weather Fleck on Flue-Cured Tobacco, E. K. Walker, Can. J. Plant Sci., vol. 47 (1967), pages 99–108.

The present invention is based on the discovery that plant injury and damage from atmospheric pollutants of the kind described can be controlled, and economic losses minimized, by application of certain 5,6-dihydro-2-methyl-1,4-oxathiin-3-carboxamides having the formula:

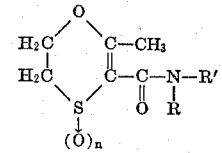

wherein $n$ is zero, 1 or 2 and R and R' may have for example such values as are disclosed in U.S. Pats. 3,393,202, July 16, 1968 and 3,399,214, Aug. 27, 1968, Kulka et al. Of particular interest are those chemicals in which R is for example hydrogen or lower alkyl (e.g., methyl, ethyl), and R' is typically phenyl, cycloalkyl (e.g., cyclohexyl), or substituted phenyl (i.e., phenyl substituted with one or more [e.g., 2 or 3] substituents such as lower alkyl [e.g., methyl, ethyl], lower alkoxy [e.g., methoxy, ethoxy], halogen [e.g., chlorine, bromine], amino, and the like). When there is more than one substitutent on the phenyl group, the substitutents may be the same or different, as will be apparent from the working examples below.

U.S. Pat. 3,249,499, von Schmeling et al., May 3, 1968, discloses the use of 5,6-dihydro-2-methyl-1,4-oxathiin-3-carboxanilide (also called 2,3-dihydro-5-carboxanilido-6-methyl-1,4-oxathiin) and related chemicals as bactericides and fungicides, particularly for agricultural purposes. U.S. Pat. 3,402,241, von Schmeling et al., Sept. 17, 1968, discloses similar use for the oxides (sulfoxides and sulfones) of said chemicals. U.S. Pat. 3,454,391, von Schmeling et al., July 8, 1969, discloses use of certain of the present chemicals as plant growth stimulants and U.S. Pat. 3,657,-449, Davis et al., Apr. 18, 1972, discloses use of the chemicals to control virus disease of plants. The present invention in contrast is concerned with the use of such chemicals to protect plants from the effects of atmospheric pollutants.

The chemical may be applied directly to plants (e.g., seeds, foliage) or to soil in which plant life is growing or is to be grown, to protect the plant life against the harmful effects of atmospheric pollutants. For example, the chemical may be applied to seed by tumbling the chemical with the seeds, either alone or in admixture with a powdered solid carrier, to coat the seeds. Typical powdered solid carriers are the various mineral silicates, e.g., mica, talc, pyrophyllite, and clays. Alternatively, the chemical may be dissolved or suspended in an oily carrier. A nonphytotoxic oil will be preferred for such purpose. Appropriate surface active agents may also be included. The chemicals may also be applied to the seeds in admixture with a conventional surface-active wetting agent, with or without additional powdered solid carrier, as by first wetting the mixture with a small amount of water and then tumbling the seeds in the slurry. The surface-active wetting agents that may be used with the chemical may be any of the conventional anionic, non-ionic, or cationic surface-active agents. Such surface-active agents are well known and reference is made to U.S. Pat. No. 2,547,724, columns 3 and 4, for detailed examples of the same. As a seed treatment, the amount of the chemical coated on the seeds will be ¼ to 12 ounces per hundred pounds of the seed. As a soil treatment the chemical may be applied as a dust in admixture with sand or soil or a powdered and/or granular solid carrier such as a mineral silicate or calcium carbonate, with or without an additional surface-active wetting agent, to the furrows with the planting of the seeds, or the chemical may be applied as an aqueous spray, if desired including a surface-active dispersing agent, or a surface-active dispersing agent and a powdered solid carrier, to the seed rows before, or with, or after planting the seeds or after the plants are established. As a soil treatment or drench, the amount of the chemical applied to the seed or plant rows will be from 0.1 to 20 pounds per acre. The chemical may be applied to irrigation water, for example at a concentration of 1 to 50 p.p.m. Also, as a soil treatment or drench, the chemical may be applied as a similar dust, granules or aqueous spray with an application rate of 0.1 to 20 pounds per acre. As a foilage treatment, the chemical may be applied to growing plants at a rate of ¼ to 10 pounds per acre. Such application is generally as an aqueous spray which also contains a surface-active dispersing agent, with or without a powdered solid carrier or an organic liquid solvent or carrier. The above-mentioned techniques may be applied any time when the plants need protection during the growing season, particularly when high concentrations of ozone or other pollutants are present or forecast. Typical formulations are as follows:

(a) Emulsifiable concentrates:

| | Percent |
|---|---|
| Oxathiin carboxamide chemical | 48.1 |
| Surfactant (e.g. Tween [trademark] 80; polyoxyethylene sorbitan monooleate) | 11.1 |
| Xylene | 48.8 |
| Total | 100.0 |

(b) Wettable powder:

| | Percent |
|---|---|
| Oxathiin carboxamide | 75.0 |
| Triton (trademark) X-120 | 2.0 |
| Daxad (trademark)-11 | 2.0 |
| Dixie clay | 21.0 |
| Total | 100.0 |

Triton X-120 is an alkylarylpolyether alcohol in dry powdered form (40% active on an insoluble carrier). The active ingredient in Triton X-120 is Triton X-100, which is a liquid nonionic surfactant (isooctylphenylpolyethoxyethanol, obtained by condensing the alkylphenol with 9-10 moles of ethylene oxide). Daxad-11 is polymerized sodium salts of alkylnaphthalene sulfonic acid (more particularly, the sodium salts of dinaphthylmethane sulfonic acids obtained from naphthalene, sulfuric acid and formaldehyde, according to U.S. Pat. 1,336,759, Schmidt, Apr. 13, 1920).

In typical practice of the invention the protectants are applied to plant life whenever exposure to ozone levels in excess of 3 p.p.h.m., and especially of at least 10 p.p.h.m., for at least one hour, is expected or forecast.

The chemicals employed in the invention are systemic and are picked up by the roots and translocated through the plant. Application of the chemical as a solid drench is quite effective, as is foliar application. The amount of chemical applied is of course less than a phytotoxic amount of the particular chemical employed, under the conditions prevailing.

An advantageous feature of the invention resides in the fact that the present plant air pollution protectants, unlike certain other substances, operate without closing the stomates of the plant. This is advantageous due to the fact that stomates open and close to properly regulate transpiration and gas exchange. If the stomates are closed, for example, by an exogenous chemical during very wet soil conditions and the plant's normal, transpiration rate is inhibited, the plant will be put under abnormal stress and, if prolonged, may die.

When applied as an aqueous suspension as a foliar spray on tobacco, the chemical is frequently used in concentrations of from 0.5 to 10 or more grams per litre and used at a rate of from about ¼ to 5 lb. or more per acre. Typically, an acre of tobacco will have from 5000 to 8000 plants.

In Examples 1-3 below, the chemical was applied with a hand sprayer to the leaves of disease-free tobacco plants, growing in soil containing adequate nutrients, at a rate corresponding to about 200 Imperial gallons of aqueous suspension per acre. For convenience, we refer to the chemical 5,6-dihydro-2-methyl-1,4-oxathiin-3-carboxanilide ($R$=hydrogen, $R'$=phenyl, $n$=zero; also called 2,3-dihydro-5-carboxanilido-6-methyl-1,4-oxathiin) as Chemical A, and 5,6-dihydro-3-methyl-1,4-oxathiin-3-carboxanilide-4,4-dioxide ($R$ and $R'$ as in Chemical A, $n$=2; also called 2,3-dihydro-5-carboxanilido-6-methyl-1,4-oxathiin 4,4-dioxide) as Chemical B. Both chemicals were formulated as a 75% wettable powder, in accordance wtih the following recipe:

| | Percent |
|---|---|
| Chemical A or B | 75 |
| Clay powder | 20 |
| Wetting Agent 1 | 2.5 |
| Wetting Agent 2 | 2.5 |

Wetting Agent 1 is sodium N-methyl N-palmitoyl laurate (General Aniline and Film Corp. Igepon [trademark] TN-74). Wetting agent 2 is Tritox X-120 or X-100 (isooctylphenylpolyethoxyethanol; Rohm and Haas Co.). Other chemicals of the above-stated formula may be substituted for Chemicals A and B.

The severity of weather fleck on tobacco plants is customarily measured by a Fleck Index Rating. The method is described on page 282 of Canadian Journal of Plant Science, vol. 41, April 1961. A leaf is given the maximum fleck rating of 100 if the spots are distributed over the entire leaf surface in sufficient intensity to render the leaf commercially valueless. In order to obtain a meaningful index, several leaves from each treated (or untreated) tobacco plant are individually rated, and an average index is computed.

In Examples 4 and 5 the protectants are evaluated on other disease-free plants, growing in soil containing adequate nutrients, by tests involving subjecting the plants to ozone in a fumigation step.

EXAMPLE 1

Tobacco plants (variety "White Gold"), growing outdoors in Ontario, Canada, free of fungus disease, were sprayed on July 17 and again on July 27, with aqueous suspensions of Chemicals A and B, previously formulated as a 75% wettable powder as noted above. The concentration of A and B in the aqueous suspension was as tabulated below. The leaves of the tobacco plants were examined on August 1 and August 16 and Fleck Index Ratings were calculated.

| | Rating on— | |
|---|---|---|
| | August 1 | August 16 |
| Chemical A: | | |
| 1 g./liter | 2.1 | 4.3 |
| 2 g./liter | 1.5 | 2.8 |
| 3 g./liter | 1.0 | 1.7 |
| Check plot (no treatment) | 12.0 | 20.2 |
| Chemical B: | | |
| 1 g./liter | 5.8 | 9.6 |
| 2 g./liter | 3.0 | 4.8 |
| 3 g./liter | 2.4 | 3.2 |
| Check plot (no treatment) | 12.0 | 20.2 |

From the foregoing, it will be seen that the chemical treatment effectively reduced the incidence and severity of weather fleck.

EXAMPLE 2

In another series of outdoor tests, tobacco plants (Variety Hicks Broadleaf) free of fungus disease, were sprayed from one to four times, on the dates indicated.

Fleck Index Ratings were made on August 17.

|  | Sprayed on— | | | | Rating |
|---|---|---|---|---|---|
|  | July 21 | July 18 | Aug. 4 | Aug. 11 |  |
| Chemical A: | | | | | |
| 1 g./liter | X | | | | 0.37 |
|  |  | X | | | 0.12 |
|  |  |  | X |  | 0.31 |
|  | X | X | X | X | 0.15 |
|  |  | X | X | X | 0.03 |
| 3 g./liter | X | | | | 0.67 |
|  |  | X | | | 0.05 |
|  |  |  | X |  | 0.36 |
|  | X | X | X | X | 0.2 |
|  |  | X | X | X | 0.05 |
| Check plot (no treatment). | | | | | 1.86 |
| Chemical B: | | | | | |
| 1 g./liter | X | | | | 1.37 |
|  |  | X | | | 0.26 |
|  |  |  | X |  | 1.26 |
|  | X | X | X | X | 0.17 |
|  |  | X | X | X | 1.02 |
| 3 g./liter | X | | | | 1.09 |
|  |  | X | | | 0.25 |
|  |  |  | X |  | 0.30 |
|  | X | X | X | X | 0.26 |
|  |  | X | X | X | 0.38 |
| Check plot (no treatment). | | | | | 1.86 |

EXAMPLE 3

In another series of outdoor tests, tobacco plants (Variety "White Gold") free of fungus disease, were sprayed on each of two dates, viz July 20 and August 5, with the chemicals at the indicated concentrations. Fleck Index Ratings were made on August 12 and September 6.

|  | Rating on— | |
|---|---|---|
|  | Aug. 12 | Sept. 6 |
| Chemical A: | | |
| 1.9 g./liter | 0.44 | 0.6 |
| 2.8 g./liter | 0.8 | 1.8 |
| Check plot (no treatment) | 8.9 | 17.6 |

While we believe that the chemicals described herein function to prevent the incidence of weather fleck, more than to eradicate weather fleck which is already present, it will be apparent from the above results that satisfactory reduction of weather fleck on tobacco plants can be achieved by use of these chemicals. The timing, concentration and frequency of spraying to obtain optimum results is a matter of practical trial and experimentation. It is noted, too, that in different years, and different geographical areas, the incidence and severity of weather fleck will differ greatly. This is probably due to the variety of atmospheric conditions.

EXAMPLE 4

This example demonstrates the effectiveness of the present plant air pollution protectants in protecting pinto beans, *Phaseolus vulgaris*, from ozone injury and damage. A drench solution is formulated by dissolving 15 mg. of the test chemical in 5 ml. of acetone and 60 mg. of isooctylphenylpolyethoxyethanol (Triton X-100). This is diluted to a 300 ml. volume with distilled water, making a 50 p.p.m. solution. One hundred ml. of this solution is used for subirrigating a single 115 mm. diameter pot. The pot contains two pinto beans at the half expanded primary leaf stage, growing in 520 g. of potting medium (concentration of treating chemical in the soil approximately 9.5 p.p.m. by weight). Any chemical that is effective in a drench solution at a concentration of 50 p.p.m. is a very potent and valuable protectant. Some of the chemicals are tested at reduced rates as shown in Table I.

Four or five days after drenching with the chemical, the plants are fumigated in the greenhouse with ozone at a concentration of 25 p.p.h.m. for 2 hours. Immediately prior to the fumigation, all the plants are subjected to at least a two-hour exposure to sunlight to insure that the stomates are open. Forty-eight hours after the fumigation, the plants are rated for ozone protection by examining the four primary leaves per pot and estimating visually the percentage of leaf area which is damaged. Subtracting this figure from 100% gives the "percent ozone protection." The figures for ozone protection reported in Table I represent an average for three replicate pots. By comparison, in check plants subjected to the same procedure but without application of any protectant chemical, 80 to 90% of the area of the primary leaves will typically be damaged. The results are summarized in Table I.

Although for convenience the chemicals are applied in this example by subirrigation, it will be understood that the soil drench can also be accomplished by applying the chemical to the top of the soil, or the chemical can be mixed in with the soil, with equivalent results.

TABLE I.—PROTECTION OF PINTO BEANS AGAINST OZONE BY SOIL DRENCH WITH VARIOUS SUBSTITUTED OXATHIINS

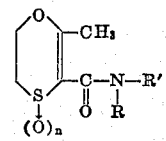

Generic type: (R=hydrogen unless otherwise specified)

| Test No. | R' | n | Concentration of chemical, p.p.m. | Ozone protection, percent |
|---|---|---|---|---|
| 1 | Phenyl | 0 | 12 | 100 |
| 2 | do | 0 | 6 | 90 |
| 3 | do | 0 | 3 | 70 |
| 4 | do | 1 | 12 | 93 |
| 5 | do | 1 | 6 | 83 |
| 6 | do | 1 | 3 | 73 |
| 7 | do | 2 | 12 | 77 |
| 8 | do | 2 | 6 | 47 |
| 9 | do | 2 | 3 | 37 |
| 10 | Cyclohexyl | 0 | 24 | 85 |
| 11 | o-Tolyl | 0 | 50 | 95 |
| 12 | do | 1 | 50 | 99 |
| 13 | do | 2 | 50 | 93 |
| 14 | p-Tolyl | 0 | 50 | 67 |
| 15 | do | 1 | 50 | 53 |
| 16 | do | 2 | 50 | 77 |
| 17 | m-Tolyl | 0 | 50 | 57 |
| 18 | do | 1 | 50 | 92 |
| 19 | do | 2 | 50 | 83 |
| 20 | 2-ethylphenyl | 0 | 50 | 100 |
| 21 | do | 1 | 50 | 93 |
| 22 | do | 2 | 50 | 98 |
| 23 | 2-methoxyphenyl | 0 | 50 | 100 |
| 24 | do | 2 | 50 | 100 |
| 25 | 3-methoxyphenyl | 0 | 50 | 100 |
| 26 | do | 1 | 50 | 100 |
| 27 | do | 2 | 50 | 100 |
| 28 | 4-methoxyphenyl | 1 | 50 | 100 |
| 29 | 2-ethoxyphenyl | 0 | 50 | 97 |
| 30 | 3-ethoxyphenyl | 0 | 50 | 100 |
| 31 | 4-ethoxyphenyl | 0 | 50 | 100 |
| 32 | 2,4-dimethoxyphenyl | 0 | 50 | 100 |
| 33 | 2-chlorophenyl | 0 | 50 | 77 |
| 34 | do | 1 | 50 | 73 |
| 35 | 3-bromophenyl | 0 | 50 | 97 |
| 36 | 2-aminophenyl | 0 | 50 | 47 |
| 37 | 3-chloro-2-methylphenyl | 0 | 50 | 47 |
| 38 | 2,3-dimethylphenyl | 0 | 50 | 60 |
| 39 | 4-methoxy-2-methylphenyl | 0 | 50 | 100 |
| 40 | Phenyl (R=methyl) | 0 | 50 | 40 |
| 41 | Phenyl (R=ethyl) | 0 | 50 | 80 |

EXAMPLE 5

This example demonstrates the effectiveness of the invention in protecting additional plant species from ozone injury and damage.

The plant species tested, and the growth stage at the time of test, are as follows:

Cotton, *Gossypium hirsutum*—two true leaf stage; soybean, *Glycine max*—two true leaf stage; tomatoes, *Lycopersicum esculentum*—5–6 true leaf stage; tobacco, *Nicotiana tabacum*—6–7 true leaf stage; and lemon, *Citrus*

*limonia*—¼ inch in diameter at the soil line and 12 inches in height. The cotton, soybean and tomatoes are grown two plants to the pot, the other species are grown one plant to the pot. The approximate weight of soil in the pots is as indicated in Table II. A 50 p.p.m. chemical solution is formulated as in Example 4 (15 mg. chemical dissolved in 5 ml. acetone and 60 mg. Triton X–100 and dilute to a 300 ml. volume with distilled water). A 24 p.p.m. solution is similarly prepared using 7.5 mg. chemical. Measured volumes of the resulting drench solutions are used to subirrigate the plants, producing the concentrations of treating chemical in the soil shown in Table II.

TABLE II.—PROTECTION OF VARIOUS PLANT SPECIES BY SOIL DRENCH; TREATMENT CONDITIONS

| Crop | Weight of soil in pot, g. | Amount of drench solution, ml. | Concentration of chemical in drench solution, p.p.m. | Concentration of chemical in soil, p.p.m. |
|---|---|---|---|---|
| Cotton | 308 | 55 | 24 | 4.3 |
| Soybean | 308 | 55 | 24 | 4.3 |
| Tomato | 526 | 100 | 50 | 9.5 |
| Lemon | 1,110 | 200 | 50 | 9.0 |
| Tobacco | 1,110 | 200 | 50 | 9.0 |

Eight days after application of the chemical, the plants are fumigated in the greenhouse with 25 p.p.h.m. of ozone for two hours. All the plants are subjected to at least a two hour sunlight exposure immediately before fumigation to insure stomatal opening. For the tomato plants, the fumigation is repeated three at 48 hour intervals; for the lemon plants the fumigation is repeated five times at weekly intervals. The plants are rated for ozone protection as described in Example 4 forty-eight hours after the last fumigation, with the results shown in Table III.

TABLE III.—OZONE PROTECTION OF PLANT SPECIES BY CERTAIN SUBSTITUTED OXATHIINS

| Protectant chemical | Rate (conc. of chem. in soil, p.p.m.) | Crop | Number of fumigations with ozone | Ozone protection, percent |
|---|---|---|---|---|
| 5,6-dihydro-2-methyl-1,4-oxathiin-3-carboxanilide. | 4.3 | Cotton | 1 | 100 |
|  | 4.3 | Soybean | 1 | 70 |
|  | 9.5 | Tomato | 3 | 97 |
|  | 9.0 | Lemon | 5 | 100 |
| 5,6-dihydro-2-methyl-1,4-oxathiin-3-carboxanilide 4-oxide. | 9.0 | Tobacco | 1 | 100 |

I claim:

1. A method of controlling the adverse effect of atmospheric pollution on plant life comprising applying thereto an effective plant air pollution protectant amount of a chemical of the formula

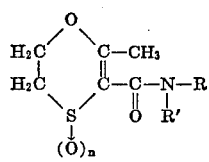

wherein R is selected from the group consisting of hydrogen and lower alkyl, R' is selected from the group consisting of cycloalkyl, phenyl, and phenyl substituted with one or more of the substituents lower alkyl, lower alkoxy, halogen, and amino, and n is zero, 1, or 2, the atmospheric pollutant which is being controlled being ozone.

2. A method as in claim 1 in which R is selected from the group consisting of hydrogen, methyl and ethyl, and R' is selected from the group consisting of cyclohexyl, phenyl, o-tolyl, p-tolyl, m-tolyl, 2-ethylphenyl, 2-methoxyphenyl, 3-methoxyphenyl, 4-methoxyphenyl, 2-ethoxyphenyl, 3-ethoxyphenyl, 4-ethoxyphenyl, 2,4-dimethoxyphenyl, 2-chlorophenyl, 3-bromophenyl, 2-aminophenyl, 3-chloro-2-methylphenyl, 2,3-dimethylphenyl, and 4-methoxy-2-methylphenyl.

3. A method as in claim 1 in which the chemical is applied as a soil treatment.

4. A method as in claim 1 in which the chemical is applied as a foliar spray.

5. A method as in claim 1 in which the chemical is applied when exposure of the plant to an ozone concentration in excess of 3 p.p.h.m. for at least one hour is forecast.

6. A method as in claim 1 in which the chemical is applied when exposure of the plant to an ozone concentration of at least 10 p.p.h.m. for at least one hour is forecast.

7. A method as in claim 1 wherein n is zero and R is hydrogen.

8. A method as in claim 7 wherein R' is phenyl.

9. A method as in claim 1 wherein n is 1 and R is hydrogen.

10. A method as in claim 9 wherein R' is phenyl.

11. A method as in claim 1 wherein n is 2 and R is hydrogen.

12. A method as in claim 11 wherein R' is phenyl.

13. A method as in claim 1 in which n is zero, R is hydrogen and R' is cyclohexyl.

14. A method as in claim 1 in which the chemical is applied when exposure of the plant to an ozone concentration of at least 10 p.p.h.m. for at least one hour is forecast, n is zero and R is hydrogen.

15. A method as in claim 14 in which R' is phenyl.

16. A method as in claim 1 in which the chemical is applied when exposure of the plant to an ozone concentration of at least 10 p.p.h.m. for at least one hour is forecast, n is 1 and R is hydrogen.

17. A method as in claim 16 in which R' is phenyl.

18. A method as in claim 1 in which the chemical is applied when exposure of the plant to an ozone concentration of at least 10 p.p.h.m. for at least one hour is forecast, n is 2 and R is hydrogen.

19. A method as in claim 18 in which R' is phenyl.

20. A method as in claim 1 in which the chemical is applied when exposure of the plant to an ozone concentration of at least 10 p.p.h.m. for at least one hour is forecast, n is zero, R is hydrogen and R' is cycolhexyl.

21. A method of controlling the adverse effect of ozone on plant life free of fungus disease comprising applying to the plant life, when the plant life is expected to be exposed to an ozone concentration in excess of 3 p.p.h.m. for at least one hour, an amount effective to protect the plant from the ozone, of a chemical of the formula $$\begin{array}{c} H_2C \diagup O \diagdown C\text{--}CH_3 \\ H_2C \diagdown \diagup \overset{\|}{C}\text{--}C\text{--}N\text{--}R' \\ S \quad \overset{\|}{O} \; \overset{|}{R} \\ \downarrow \\ (O)_n \end{array}$$

where n is zero, 1 or 2, R is selected from the group consisting of hydrogen, methyl and ethyl, and R' is selected from the group consisting of cyclohexyl, phenyl, o-tolyl, p-tolyl, m-tolyl, 2-ethylphenyl, 2-methoxyphenyl, 3-methoxyphenyl, 4-methoxyphenyl, 2-ethoxyphenyl, 3-ethoxyphenyl, 4-ethoxyphenyl, 2,4-dimethoxyphenyl, 2-chlorophenyl, 3-bromophenyl, 2-aminophenyl, 3-chloro-2-methylphenyl, 2,3-dimethylphenyl, and 4-methoxy-2-methylphenyl.

22. A method as in claim 21 in which the said expected ozone concentration is at least 10 p.p.h.m., n is zero, and R is hydrogen.

23. A method as in claim 22 in which R' is phenyl.

24. A method as in claim 21 in which the said expected ozone concentration is at least 10 p.p.h.m., n is 1, and R is hydrogen.

25. A method as in claim 24 in which R' is phenyl.

26. A method as in claim 21 in which the said expected ozone concentration is at least 10 p.p.h.m., n is 2 and R is hydrogen.

27. A method as in claim 26 in which R' is phenyl.

28. A method as in claim 21 in which the said expected ozone concentration is at least 10 p.p.h.m., $n$ is zero, R is hydrogen and R' is cyclohexyl.

29. A method of reducing the incidence and severity of weather fleck on tobacco plants comprising applying thereto an effective amount of a chemical of formula:

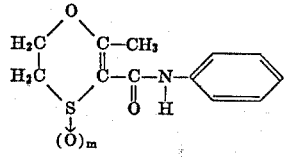

wherein $m$ is zero or 2.

30. A method as in claim 29, wherein the chemical is applied in the form of an aqueous suspension.

31. A method as in claim 30, wherein a wetting agent is incorporated in the aqueous suspension.

32. A method as in claim 29, wherein the chemical is applied at a rate of at least ¼ pound per acre.

33. A method as in claim 29, wherein the plants are free of fungus disease.

34. The method of claim 29, wherein $m$ is zero.

35. The method of claim 29, wherein $m$ is 2.

References Cited

UNITED STATES PATENTS

| | | | |
|---|---|---|---|
| 3,249,499 | 5/1966 | Von Schmeling | 424—276 |
| 3,402,241 | 9/1968 | Von Schmeling | 424—276 |
| 3,454,391 | 7/1969 | Von Schmeling | 71—77 |

OTHER REFERENCES

Walker: Plant Disease Reporter, vol. 45, No. 8 (1961), pp. 583–586.

LEWIS GOTTS, Primary Examiner

C. L. MILLS, Assistant Examiner

U.S. Cl. X.R.

71—91